United States Patent [19]

Alberkrack

[11] 4,233,557
[45] Nov. 11, 1980

[54] SWITCHING POWER SUPPLY

[75] Inventor: Jade H. Alberkrack, Chandler, Ariz.

[73] Assignee: Motorola, Inc., Schaumburg, Ill.

[21] Appl. No.: 74,833

[22] Filed: Sep. 12, 1979

[51] Int. Cl.³ .............................................. G05F 1/58
[52] U.S. Cl. ....................................... 323/9; 323/17;
323/DIG. 1; 363/20; 363/49
[58] Field of Search ................. 323/17, 22 T, DIG. 1,
323/9, 20; 363/19, 20, 49

[56] References Cited
U.S. PATENT DOCUMENTS

| 4,025,843 | 5/1977 | Parker | 323/DIG. 1 |
| 4,028,596 | 6/1977 | Weber | 363/20 X |
| 4,180,852 | 12/1979 | Koizumi et al. | 363/49 |

Primary Examiner—A. D. Pellinen
Attorney, Agent, or Firm—Vincent B. Ingrassia

[57] ABSTRACT

A switching power supply includes a two input NAND gate one input of which is coupled to a differentiated fixed frequency signal. The output of the NAND gate is coupled to an output switching device which drives a transformer. The output voltage appearing across the secondary winding of the transformer is compared with a reference voltage in a comparator which drives a light emitting diode. The light emitting diode is optically coupled to a pulse width modulator circuit for varying the width of pulses applied to the first input of the NAND gate. The circuit also includes soft start and over-current protection features.

9 Claims, 1 Drawing Figure

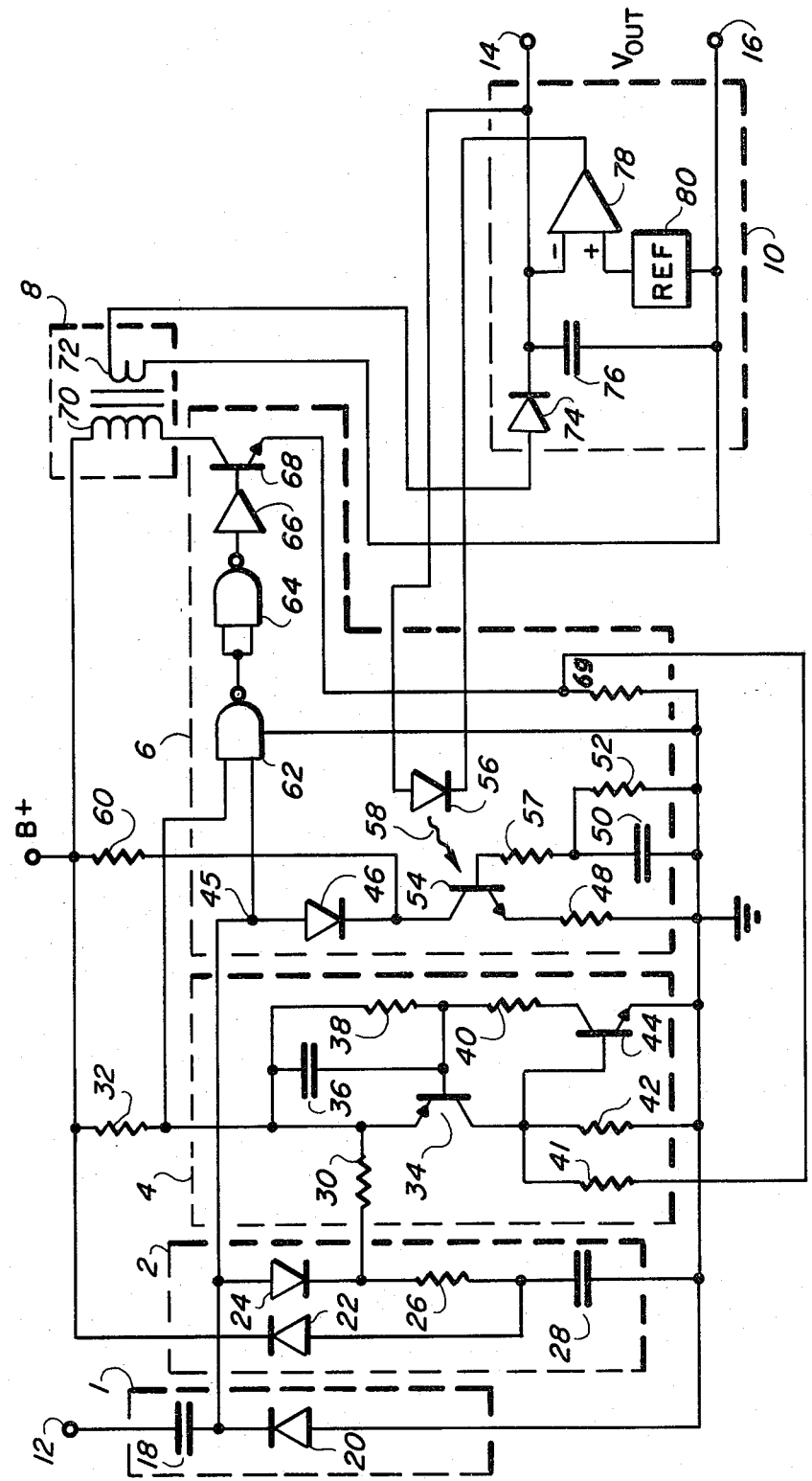

SWITCHING POWER SUPPLY

BACKGROUND OF THE INVENTION

1. Field of the Invention

This invention relates generally to switching power supplies and, more particularly, to a pulse width modulator employing Schmidt trigger NAND gates.

2. Description of the Prior Art

Switching type power supplies are well known. A first type employs a fixed frequency oscillator wherein the output voltage is controlled by varying the pulse width. A second, less expensive type is one in which the on time in fixed and the output voltage is controlled by varying the off time. While the former is more accurate, it is both complex and expensive. The latter variety (fixed on time-variable off time) presents certain problems since as the load becomes smaller, the oscillator frequency decreases until eventually, the transformer output becomes audible. While not as expensive as the fixed frequency arrangements, this less expensive variety is still relatively complex.

SUMMARY OF THE INVENTION

It is an object of the present invention to provide an improved pulse width modulator circuit.

It is a further object of the invention to provide an improved pulse width modulator circuit of the fixed frequency type which is both simple and inexpensive to manufacture.

According to a broad aspect of the invention there is provided a switching type power supply for receiving a fixed frequency pulse train at its input and generating therefrom an output voltage, comprising: first means having a variable resistance for differentiating said fixed frequency pulse train to produce a differentiated pulse train; a Schmidt NAND gate having first and second inputs and an output, said first input coupled to said first means for receiving said differentiated pulse train; switching means coupled to the output of said NAND gate; a transformer having primary and secondary windings, said primary winding coupled to said switching means and inducing a voltage across said secondary winding; second means coupled to said secondary winding for generating said output voltage; a source of a reference voltage; third means for comparing said reference voltage with said output voltage and for generating a signal indicative of the difference therebetween; fourth means coupled to said first means and said third means and responsive to said signal for varying the resistance of said first means; and fifth means coupled to said switching means and to the second input of said NAND gate for controlling passage of said differentiated pulse train through said NAND gate.

The above and other objects, features and advantages of the present invention will be more clearly understood from the following detailed description taken in conjunction with the accompanying drawings, in which:

BRIEF DESCRIPTION OF THE DRAWINGS

The sole FIGURE is a schematic diagram of the inventive pulse width modulator circuit.

DESCRIPTION OF THE PREFERRED EMBODIMENT

Referring to the drawing, there is shown a schematic diagram of the inventive switching power supply circuit which includes an input portion 1, a soft start circuit 2, an over-current section 4, a pulse width modulator section 6, a transformer section 8 and an output circuit 10. The circuit is designed to receive at terminal 12 a 50 percent duty cycle 25 kilohertz signal. This signal is applied to capacitor 18 (e.g. 470 picofarads) which in conjunction with transistor 54 differentiates the 25 kilohertz square wave. Diode 20 is coupled between capacitor 18 and ground in the manner shown so as to remove the negative portion of the differentiated signal.

Transistor 54 in the pulse width modulator section acts as a variable resistor and in conjunction with capacitor 18 forms a variable differentiator which shortens or lengthens the duty cycle of the output drive signal. Transistor 54 has a base which is coupled to a filter circuit comprising capacitor 50, resistor 57 and resistor 52. The emitter of transistor 54 is coupled via resistor 48 to ground, and the collector of transistor 54 is coupled firstly via diode 46 to node 45 and secondly via resistor 60 to a positive source of supply voltage. The signal which appears at node 45 is applied to a first input of Schmidt trigger NAND gate 62 (for example of the type manufactured by Motorola Semiconductor Inc. and bearing part number MC14093B). The second input of NAND gate 62 is coupled through the source of supply voltage via resistor 32.

Assuming that the second input of NAND gate 62 is high, the signal appearing at node 45 will pass through NAND gate 62 to a second NAND gate 64 having its first and second inputs tied together. Thus, NAND gate 64 merely acts as an inverter. The output of NAND gate 64 is applied to a driver buffer 66 the output of which is coupled to the base of switching transistor 68 having an emitter coupled to ground and a collector coupled to the primary winding 70 of transformer 8.

The output of NAND gate 64 will be a fixed frequency pulse train wherein the width of the pulse is dependent upon the resistance of transistor 54. After amplification in buffer driver 66, transistor 68 is turned on and off by the applied pulse train. Thus, a signal in the form of a series of pulses at the collector of transistor 68 is applied to primary winding 70. As a result, a pulsed voltage is induced in secondary winding 72 which voltage is rectified by diode 74 and filtered by capacitor 76. The resultant voltage forms the output voltage which appears across terminals 14 and 16.

The output voltage is compared with a reference voltage 80 in for example a differential amplifier 78. The reference voltage may be generated in a number of known manners; for example, through the use of a zener diode. A light emitting diode 56 has an anode coupled to the output voltage and has a cathode coupled to the output of differential amplifier 78. If the output voltage appearing at terminal 14 is higher than the reference voltage, the output of amplifier 78 will be such as to increase current through light emitting diode 56. This diode is optically coupled to transistor 54 as is indicated by arrow 58. Thus, under these conditions, transistor 54 will be turned on harder. This in effect reduces its resistance and the pulses appearing at node 45 will become narrowed. This process will continue until the output voltage is substantially equal to the reference voltage. On the other hand, if the output voltage is less than the reference voltage, the current through light emitting diode 56 will decrease which in turn causes the resistance of transistor 54 to become higher. This will cause the pulses appearing at node 45 to be lengthened until the output voltage is substantially equal to the reference voltage.

The soft start portion of the circuit 2 comprises diodes 22 and 24, resistors 26 and 30, and capacitor 28. When the circuit is first powered and pulses begin to appear at terminal 12, capacitor 28 appears as a low resistance and begins to charge via diode 24 and resistor 26. Thus, pulses appearing at node 45 will start out relatively narrow and increase in width as capacitor 28 is charged. Once capacitor 28 is charged, the feedback process as above described takes over. Resistor 30 is large (e.g. 1 meg ohm) and back biases diode 24 which effectively disconnects the soft start circuit from differentiator capacitor 18. Diode 22 coupled between the source of supply voltage and the junction of resistor 26 and capacitor 28 serves to discharge capacitor 28 when the circuit is shut down thus assuring that capacitor 28 is completely discharged when power is again applied to the circuit.

The over-current portion of the circuit comprises resistors 38, 40, 42 and 69, capacitor 36 and transistors 34 and 44. Resistors 38 and 40 form a voltage divider, the junction of which is applied to the base of transistor 34. The emitter of transistor 34 is coupled via resistor 32 to the source of supply voltage, and the collector of transistor 34 is coupled to ground via resistor 42. Transistor 44 has a base coupled to the collector of transistor 34, an emitter coupled to ground and a collector coupled to resistor 40 as shown in the drawing. Capacitor 36 is coupled in parallel with resistor 38 and across the base emitter junction of transistor 34.

The over-current portion of the circuit functions as follows. If the output of the circuit (terminals 14, 16) were to become shorted, the current in primary winding 70 would become very high and in all likelihood destroy output switching transistor 68. To avoid this, the emitter current of transistor 68 is monitored by coupling the voltage generated across resistor 69 to the base of transistor 44 via resistor 41. The base of transistor 44 is coupled to the junction of resistors 41 and 42 which form a voltage divider. When the emitter current of transistor 68 reaches some predetermined value (for example 3.5 amps), base drive will be supplied to transistor 44 turning it on. Since the collector of transistor 44 is coupled via resistors 38 and 40 to the second input of NAND gate 62, this second input will be pulled down when transistor 44 turns on. Thus, the width of the pulses out of NAND gate 62 will become very narrow. If the overcurrent situation continues, capacitor 36 will be charged sufficiently by the voltage drop across resistor 38 permitting transistor 34 to turn on. This in turn supplies additional base drive to transistor 44 causing positive regeneration. Thus, transistors 34 and 44 will be latched on, and the second input of NAND gate 62 to be pulled to ground thus preventing any pulses from appearing at its output.

Thus, it can be seen that by employing the two input NAND gate of the Schmidt trigger type, all of the features of the expensive switching power supply have been achieved. That is, the system operates at a fixed frequency and its output voltage is controlled by pulse width modulation (a variable differentiator). Notwithstanding, the system is very simple and inexpensive to manufacture.

The above description of a preferred embodiment is given by way of example only. Changes in form and details may be made by one skilled in the art without departing from the scope of the invention as defined by the appended claims.

I claim:

1. A switching type power supply for receiving a fixed frequency pulse train at its input and generating therefrom an output voltage, comprising:
    first means having a variable resistance for differentiating said fixed frequency pulse train to produce a differentiated pulse train;
    a Schmidt NAND gate having first and second inputs and an output, said first input coupled to said first means for receiving said differentiated pulse train;
    switching means coupled to the output of said NAND gate;
    a transformer having primary and secondary windings, said primary winding coupled to said switching means and inducing a voltage across said secondary winding;
    second means coupled to said secondary winding for generating said output voltage;
    a source of a reference voltage;
    third means for comparing said reference voltage with said output voltage and for generating a signal indicative of the difference therebetween;
    fourth means coupled to said first means and said third means and responsive to said signal for varying the resistance of said first means; and
    fifth means coupled to said switching means and to the second input of said NAND gate for controlling passage of said differentiated pulse train through said NAND gate.

2. A switching type power supply according to claim 1 further including a soft start circuit coupled between the output of said first means and ground potential, said soft start circuit comprising:
    a first diode having an anode coupled to said differentiated pulse train and having a cathode;
    a first capacitor having first and second terminals, said first terminal coupled to ground potential; and
    a first resistor coupled between said second terminal and said cathode.

3. A switching type power supply according to claim 2 further including means for discharging said first capacitor.

4. A switching type power supply according to claim 1 wherein said first means comprises:
    a capacitor having a first terminal coupled to said fixed frequency pulse train and having a second terminal coupled to said first input of said NAND gate; and
    variable resistance means coupled between said second terminal and ground.

5. A switching type power supply according to claim 4 wherein said switching means comprises a transistor having base, emitter and collector terminals, said base terminal coupled to the output of said NAND gate, said emitter terminal coupled to ground potential and said collector terminal coupled to said primary winding.

6. A switching type power supply according to claim 4 wherein said second means comprises:
    a second diode coupled in series with said secondary winding; and
    a second capacitor coupled across said secondary winding.

7. A switching type power supply according to claim 4 wherein said fourth means comprises:

a light emitting diode having an anode coupled to said output voltage and a cathode coupled to said signal.

8. A switching type power supply according to claim 7 wherein said variable resistance means comprises:
a second transistor optically coupled to said light emitting diode for providing a current conducting path between said first input of said NAND gate and ground potential, said second transistor representing a resistance which increases as light from said light emitting diode decreases.

9. A switching type power supply according to claim 8 wherein said fifth means comprises:
sixth means for monitoring current through said primary winding;
seventh means for reducing the width of pulses passing through said NAND gate when said current exceeds a predetermined value; and
eighth means for blocking passage of pulses through said NAND gate if said current continues to exceed said predetermined value.

* * * * *